United States Patent [19]

Logan et al.

[11] Patent Number: 4,724,617
[45] Date of Patent: Feb. 16, 1988

[54] APPARATUS FOR TRACING THE LENS OPENING IN AN EYEGLASS FRAME

[75] Inventors: David J. Logan, Glastonbury; Kenneth O. Wood, Ellington; Charles Hevenor, Bolton, all of Conn.

[73] Assignee: Gerber Scientific Products, Inc., Manchester, Conn.

[21] Appl. No.: 896,624

[22] Filed: Aug. 14, 1986

[51] Int. Cl.⁴ .............................................. G01C 25/00
[52] U.S. Cl. ......................................... 33/28; 33/503; 33/513
[58] Field of Search ................. 33/1 M, 28, 200, 504, 33/505, 513, 562; 364/413; 408/3; 409/67, 68, 79, 80

[56] References Cited

U.S. PATENT DOCUMENTS 2,878,567 3/1959 Hofman et al. ..................... 33/28
4,437,151 3/1984 Hurt et al. ....................... 35/503 X

FOREIGN PATENT DOCUMENTS 913688 6/1954 Fed. Rep. of Germany .......... 33/28

Primary Examiner—William D. Martin, Jr.
Attorney, Agent, or Firm—McCormick, Paulding & Huber

[57] ABSTRACT

Apparatus for tracing the inner periphery of an eyeglass frame lens opening and for producing a set of coordinates each of which coordinate set describes a sensed position along the traced path. The eyeglass frame is positioned on an overhead bridge and a stylus held by a stylus holding fixture engages the eyewire groove of the lens opening and is used as a guide to move the fixture along the traced path. Encoding arms are coupled to the fixture and drive respective associated rotary encoders whose outputs represent the distance each arm has moved from a first to a second sensed location along the path. A computer operates in accordance with an instruction set to generate coordinates for each of the sensed points along the traced path whereby the set of coordinates characterizes the size and shape of the lens opening.

18 Claims, 14 Drawing Figures

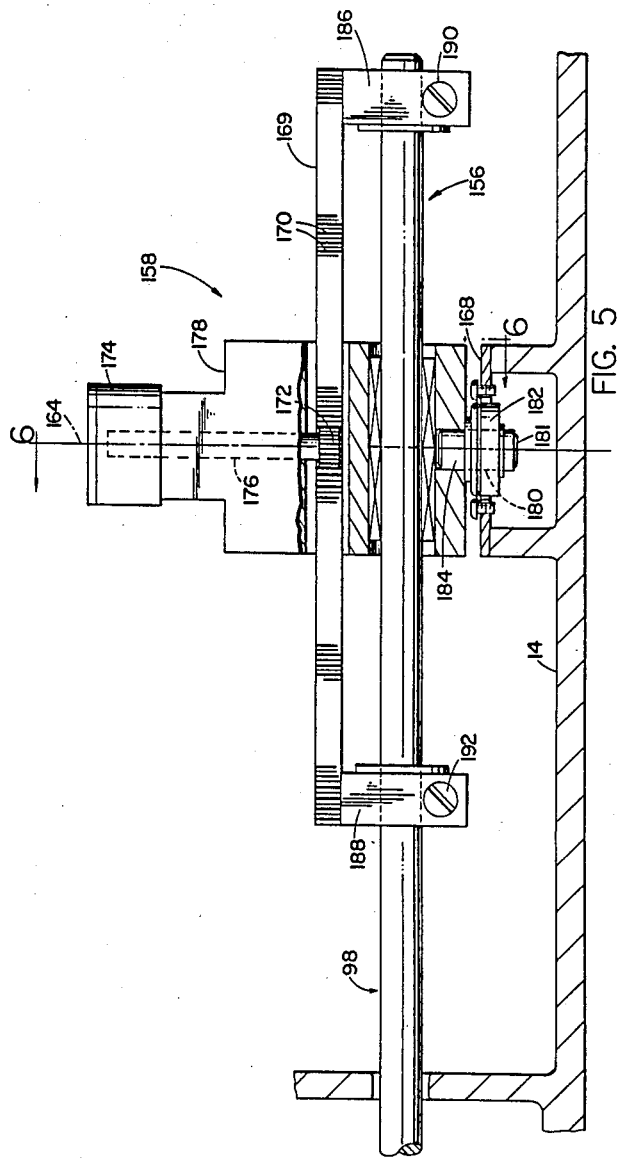

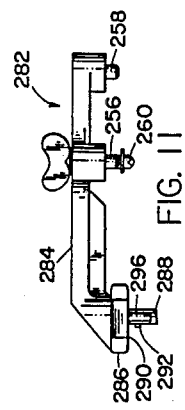
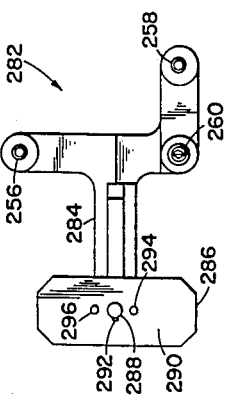
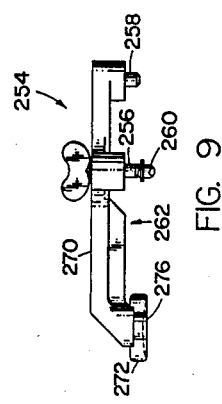
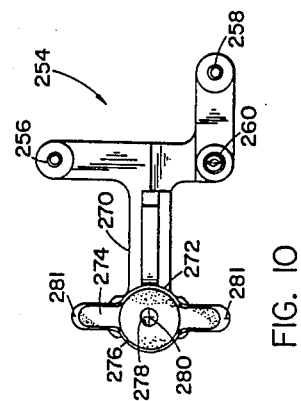
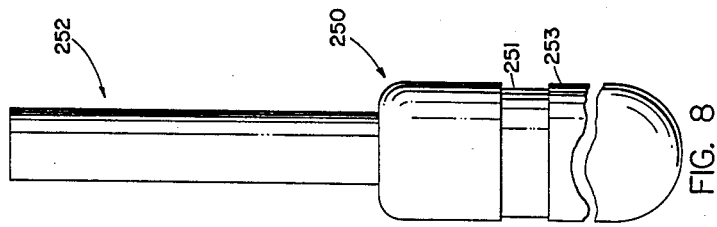

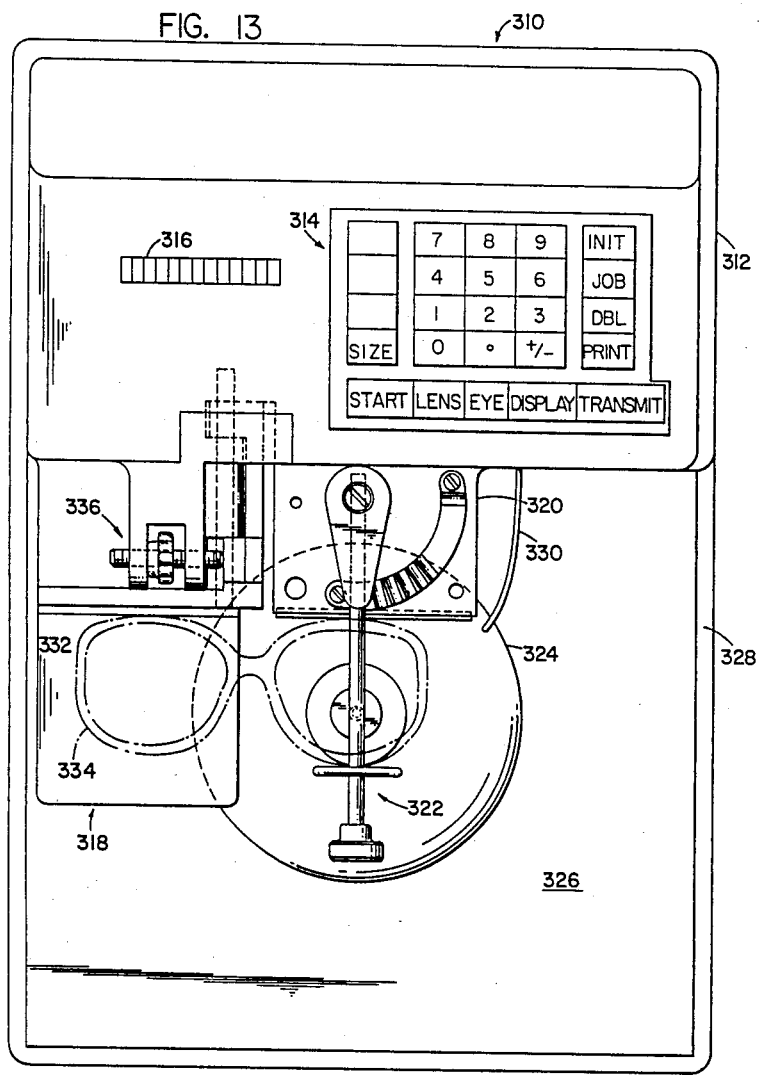

APPARATUS FOR TRACING THE LENS OPENING IN AN EYEGLASS FRAME

BACKGROUND OF THE INVENTION

The present invention relates generally to appartaus for tracing the outline of an article and deals more specifically with apparatus for tracing the inner periphery of an eyeglass frame lens opening and for producing a number of coordinates each of which represents an associated position along the traced path and which coordinates collectively characterize the size and shape of the traced lens opening in the eyeglass frame.

Conventionally, an optical lens blank is contoured or edged to fit the lens opening in an eyeglass frame by apparatus intended for that purpose. In such edging apparatus, a pattern substantially replicating the size and shape of the lens opening in an associated eyeglass frame is typically used as a guide to control the edging apparatus so that the edged lens properly fits the opening in the frame. Generally, an eyeglass frame manufacturer provides such patterns for each of the different eyeglass frame styles that he sells. These patterns are usually identified and often kept in an inventory maintained by the user of such patterns. In lens edging businesses in which an inventory of patterns is kept, a pattern associated with a given frame style is selected from the inventory, assuming such a pattern is in the inventory, and the pattern is used with edging apparatus to contour an optical lens to fit the given frame style lens opening.

Over the past several years, the proliferation of eyeglass frame styles and an increased number of eyeglass frame manufacturers have made it impractical for those operating from an inventory of patterns to order and maintain a pattern for each of the different eyeglass frame styles due in part to the increased space requirements necessary to store the greater number of different patterns. In addition, the process of selecting a given pattern from the inventory has become more difficult, inconvenient and time consuming. Oftentimes in a large laboratory a given pattern may be in use and not available for selection.

Another problem associated with contouring or edging an optical lens to the size and shape of the lens opening in a given frame in accordance with a pattern associated with the frame is that the frame lens opening associated with a given frame style may not be consistent from frame-to-frame. Occasionally, an optical lens peripherally contoured from a pattern having a nominal lens opening shape and supplied for a given frame style may not properly fit the lens opening of an actual frame of that style.

It would be desirable therefore to overcome the abovementioned problems associated with using a lens pattern for contouring optical lenses not to supply any such patterns in advance of their need but to instead generate a pattern immediately before the contouring or edging operation by tracing the inner periphery of the lens opening of the actual frame with which the pattern is to be used.

A number of methods and devices are used for making a pattern either directly or indirectly from a frame or from a tracing of the frame lens opening. It is usually required that the frame lens opening be properly centered so that the mechanical center of a pattern corresponding to the size and shape of the associated lens opening coincide with the boxing center of the lens shape when the boxing measurement system is used to dimension a lens opening, lens or pattern.

The boxing center is defined as the center of the smallest rectangle which encloses the lens shape using horizontal and vertical lines. The pattern size or A dimension is defined as the distance between the two vertical sides of the box. The distance between the top and bottom of the box is the vertical or B dimension of the pattern. Because a very small error of even a few tenths of a millimeter in centering a pattern can result in an improper fitting lens, a grid like scale sometimes printed on a pattern blank and comprised of measured distances left, right, up and down from an origin is used to aid in the proper centering of the frame lens opening. Once the frame is centered, the lens opening shape is traced and the pattern blank cut along the marked outline. Any roughness in the pattern edge is smoothed with a file or wheel grinder. A pattern made using the above described method cannot be assured to have the same size as the frame lens opening unless compensation is made for the thickness of the tracing pen and the depth of the eyewire groove among others.

The foregoing method for tracing a frame lens opening to determine the size and shape of the lens opening requires a high degree of skill, is time consuming and subjects a resultant pattern made from the tracing to possible error.

An object of the present invention is therefore to overcome the foregoing problems and limitations by providing apparatus for tracing the inner periphery of the lens opening in an eyeglass frame to produce for each of a number of sensed positions along the tracing path a set of coordinates that define the path and collectively dimensionally characterize the size and shape of the traced lens opening.

A further object of the present invention is to provide apparatus for tracing the outer periphery of a lens or pattern to produce for each of a number of sensed positions along the tracing path a set of coordinates that define the path and collectively characterize the size and shape of the traced lens or pattern.

Another object of the present invention is to store in a memory the set of coordinates characterizing the size and shape of the lens opening associated with a given frame for subsequent retrieval as needed.

Yet another object of the present invention is to provide apparatus for tracing the inner periphery of a lens opening in an eyeglass frame wherein the apparatus is relatively inexpensive, easy to use, reliable and capable of accurately replicating a tracing result.

SUMMARY OF THE INVENTION

The present invention resides in apparatus for tracing the inner periphery of an eyeglass frame lens opening and for producing a number of coordinates each of which represents an associated position along the traced path. The apparatus includes an eyeglass frame support or bridge for holding the frame lens opening in a plane substantially parallel with a reference plane. Tracing means comprising a stylus held by a stylus holding fixture and arranged for movement in the vicinity of the frame support is provided for tracing the inner periphery of the lens opening in an eyeglass frame located on the support. The stylus travels in a plane parallel to the reference plane as it follows as a guide the eyewire groove along the inner periphery of the lens opening. Sensing means coupled to the tracing means cooperates with the tracing means and senses the tracing means at a number of positions along the travel path. Computing means responsive to the sensing means determines for each of the number of positions along the travel path a coordinate that defines the associated position and a set of such coordinates are located at spaced apart intervals from one another to dimensionally characterize the size and shape of the traced lens opening.

In one preferred embodiment, rotary encoders are driven by encoding arms which are coupled to and moved by a stylus holding fixture as the frame lens opening is traced. A microprocessor computes the coordinates for a predetermined number of sensed positions along the stylus fixture travel path and determines the A and B box dimensions, the boxing or mechanical center, and radii at a number of positions around the periphery of the lens opening in addition to other dimensional data to characterize the size and shape of the lens opening.

BRIEF DESCRIPTION OF THE DRAWINGS

Other objects, features and advantages of the present invention will be readily apparent from the following written description and claims taken in conjunction with the drawings wherein:

FIG. 5 is a side elevational view partially cut away showing one of the encoder arms slideably coupled to its associated rotatable encoder mechanism.

FIG. 8 is a side view of the tracing stylus used in following the outer periphery of a lens or a pattern.

FIG. 9 is a side view of a lens mounting block assembly for holding a lens for peripheral tracing with the apparatus of the present invention.

FIG. 10 is a bottom plan view of the lens mounting block assembly of FIG. 9.

FIG. 11 is a side view of a pattern mounting block assembly for holding a pattern for peripheral tracing with the apparatus of the present invention.

FIG. 12 is a bottom plan view of the pattern mounting block assembly of FIG. 11.

FIG. 13 is a top plan view of the eyeglass frame tracing apparatus in another embodiment of the present invention wherein a digitizer tablet cooperates with a sensor in the stylus holding fixture to determine the coordinate associated with each sensed position along the travel path.

DETAILED DESCRIPTION OF THE PREFERRED EMBODIMENTS

Figure 1:
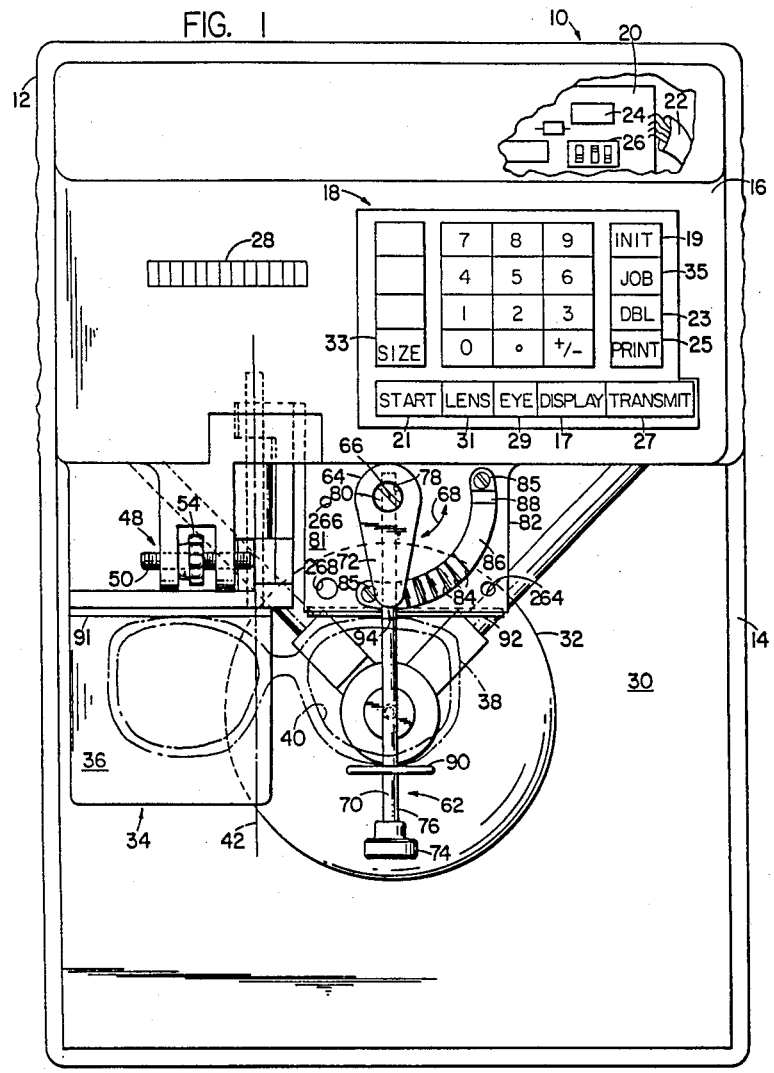
FIG. 1 is a partial top plan view of the eyeglass frame tracing apparatus embodying the present invention showing an eyeglass frame in phantom resting on the frame support and held in position by a holding mechanism, a stylus and an associated stylus holding fixture, a data and command entry keypad for activating and controlling the apparatus and an alphanumeric display.
Figure 2:
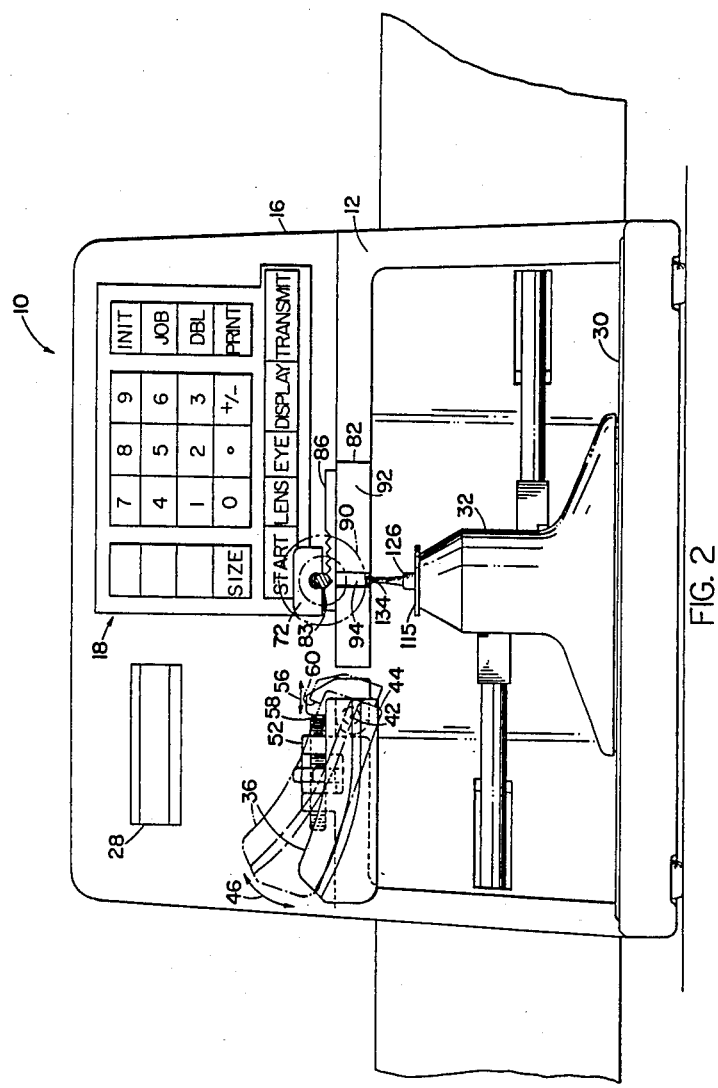
FIG. 2 is a front view of the frame tracing apparatus of FIG. 1.

Turning now to the drawings and considering FIGS. 1 and 2 specifically, the frame tracing apparatus embodying the present invention is shown and designated 10. The tracing apparatus 10 includes a housing 12 comprising a base portion 14 and an upper portion or cover 16 adapted for assembly with the base portion 14. The housing 12 also includes a substantially flat surface 30 along which a stylus holding fixture 32 is moved in a plane substantially parallel to the plane of the surface 30.

The cover 16 of the housing 12 includes a keypad 18 for entering data or other information in the form of digitally encoded electrical signals to activate and control the operation of the tracing apparatus 10. The keypad 18 is well known to those skilled in the art and preferably is of the membrane covered type to protect the electrical contacts associated with the individual keys from contamination.

The cover 16 is shown partially cut away in FIG. 1 to reveal an electronic circuit board 20 upon which circuit board electronic components comprising the control, computing, and other circuitry of the frame tracing apparatus 10 are located and interconnected. Electrical control signals representative of, for example, start trace, initialize, print, etc. are inputted to and outputted from the circuit board 20 via a multiple lead electrical conductor 22. The conductor 22 is electrically coupled to the various sub-assemblies comprising the frame tracing apparatus 10 and which sub-assemblies are readily identifiable in the present disclosure.

A controller or microprocessor 24 is located on the circuit board 20 and contains an instruction set comprising a control program. The controller 24 operates in response to the various ones of the inputted and sensed electrical signals and directs in accordance with the instruction set the operation of the frame tracing apparatus 10.

An option selection switch 26 is mounted on the circuit board 20 and is electrically coupled to the controller 24. The switch 26 is an 8 bit DIP switch and is operated to a desired one of a number of positions to select a corresponding one of a number of different predetermined combinations of output information associated with the characterization of the size and shape of a traced lens opening, or a traced lens or a traced pattern. The predetermined combinations may include, for example, the box dimensions of the frame lens opening which dimensions are referred to as A and B dimensions and the boxing center or mechanical center of the box and accordingly the lens opening. Once the box dimensions and the mechanical center are determined, the longest or effective diameter (ED) across the lens opening center and its associated angle is calculated. The effective diameter (ED) is used to select a minimum lens blank size to ensure that a desired shape can be cut from it, that is, a lens will not be ground thicker than necessary nor too thin at its edges for a specific frame chosen. In accordance with an option selected through the operation of switch 26, radii lengths are calculated at a predetermined number of spaced apart locations along the traced path. For example, one selected option may cause the instruction set to calculate and display radii lengths at 90° intervals and another selected option may cause the instruction set to calculate and display radii lengths at 45° intervals along the traced path. Combinations differing from the predetermined combinations may be implemented by modifying the instruction set. Although a predetermined number of radii are calculated and displayed, the instruction set in the preferred embodiment characterizes a given trace by calculating 400 radii lengths and their associated respective angles.

An alphanumeric display device 28 is also mounted on the cover 16 and is coupled to and electrically driven by electronic circuitry located on the circuit board 20. The display 28 functions as an operator prompt by displaying messages and instructions to carry out the tracing procedure. The display 28 also displays the value of dimensional data associated with the characterization of the size and shape of a traced lens opening, a traced lens or a traced pattern. The display mode is activated after a trace is completed to display the dimensional data by operating the DISPLAY function key 17 on the keypad 18. The display device 28 is generally well known and understood by those skilled in the art.

An eyeglass frame support structure or bridge designated 34 includes a bridge surface 36 upon which an eyeglass frame, shown in phantom in FIG. 1 and designated 38, rests upon and is oriented such that the portion of the frame including the lens opening 40 extends in a cantilevered fashion over the area of the surface 30 through which the stylus holding fixture 32 travels. The bridge surface 36 is contoured somewhat to accommodate any slight curvature in the eyeglass frame defining the plane of the lens opening. The bridge 34 pivots about an axis 42 that extends parallel to the surface 30 and axially through one end 44 of the bridge. The bridge 34 and an eyeglass frame resting on the bridge surface 36 rotate in the direction of arrow 46 toward and away from the surface 30 so that the orientation of the plane of the lens opening in the vicinity of the stylus holding fixture 32 is substantially parallel with the plane of the surface 30 during the tracing procedure. The rotation of the bridge 34 is controlled by an adjustment mechanism 48 which comprises a threaded shaft 50 threaded through and held in place by a yoke 52, an adjustment knob 54 attached to the shaft and which knob when rotated causes the shaft to move linearly in the direction of arrow 56. The bridge 34 pivots about the axis 42 when one end 58 of the threaded shaft 50 comes into contact with and pushes against a stop 60 of the bridge. The bridge 34 has a limited pivotal movement through an angular distance proportional to the distance that the end 58 of shaft 50 moves in the direction of arrow 56.

An eyeglass frame holding mechanism 62 is rotatably mounted on a platform 82 located adjacent the bridge 34 and is used to maintain an eyeglass frame in position above the travel area of the stylus holding fixture 32 during the tracing process. The holding mechanism 62 comprises an arm 64 arranged for pivotal movement in a direction indicated by the arrow 68 and about an axis 66 which axis extends generally perpendicular to the surface 30. The arm 64 includes an elongated rod 70 journaled at one end in a mounting collar 72 and in a grip 74 at its opposite free end 76. The mounting collar 72 is rotatably coupled by an attachment device such as a shoulder screw 80 passing through an opening 78 in the collar 72 and threaded into the surface 81 of the platform 82. The attachment can also be a quarter turn fastner or any other suitable fastner well known in the art.

The mounting collar 72 also includes a spring-loaded plunger 83 arranged and aligned for engagement with one of a number of indents 84,84 formed along the surface of a quarter circle shaped bracket 86 and which bracket is secured to the surface 81 of the platform 82 by screws 85,85. Unless the arm 64 is moved, the engagement of the plunger 83 and an indent 84 causes the arm to remain stationary at each of the indent locations along the bracket 86. The positioning of the arm 64 at a location corresponding to one of the indents is selected by an operator so that the arm is at its best orientation along the bracket 86 for maintaining an eyeglass frame in position during the tracing procedure. The quarter circle bracket 86 also includes an indent 88 which is used to retain the arm 64 in an at-rest position.

The eyeglass frame holding mechanism 62 includes a frame engaging member 90 that slides coaxially along the surface of the rod 70 of arm 64. The member 90 is intended to be slid into contact with the eyeglass frame under thumb pressure. An eyeglass frame is placed on the bridge surface 36 and oriented above the surface 30 as explained above. The frame additionally is placed against a front edge surface 91 of the bridge 34. The edge surfaces 92 and 91 respectively lie in the same plane and serve to provide an alignment means for a frame so that the A axis of the frame is properly oriented with the A axis of a lens or pattern associated with the lens opening in the frame. If the frame is of a style having a protruding nose piece extending above the frame, the frame is rotated 180° so that the bottom portion of the frame is in contact with the edge surfaces 92 and 91 to achieve the proper A axis alignment. As the member 90 contacts the frame 38 it cocks slightly and self-jams to restrain the frame from movement without applying force to the frame by way of additional thumb pressure and the member 90 itself is prevented from further movement along the surface of the rod 70. Consequently, a frame is held in position without distorting the frame lens opening. This feature is especially important when tracing lens openings in metal eyeglass frames wherein the metal frame is easily distorted with the application of minimal force.

Figure 3:
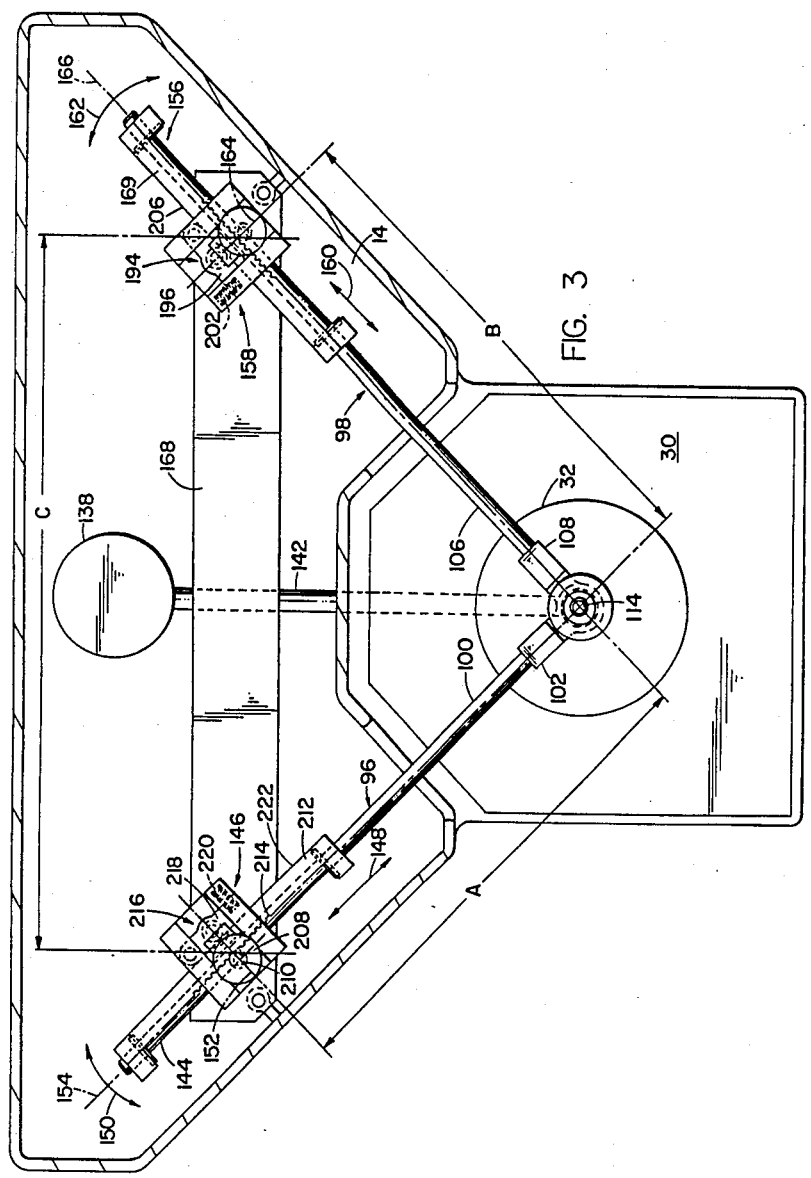
FIG. 3 is a top plan view of the frame tracing apparatus of FIG. 1 showing the encoder arms pivotally coupled to the stylus holding fixture at one end and each of the arms slidably coupled at their free end to an associated rotatable encoder mechanism.
Figure 4:
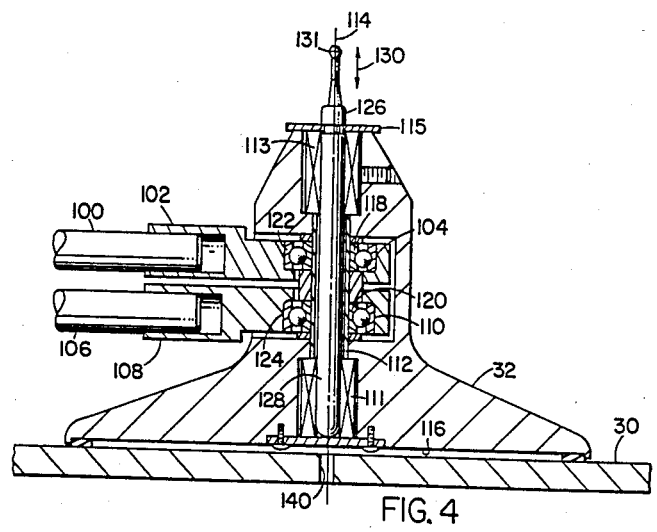
FIG. 4 is a side sectional view of the stylus holding fixture showing one end portion of each of the encoder arms coupled to the fixture.

Still referring to FIGS. 1 and 2 and additionally to FIGS. 3 and 4, the stylus holding fixture 32 is shown rotatably coupled about a longitudinal axis 114 to two encoder arms 96,98 respectively. The encoder arm 96 is axially journaled at one end 100 in a rod end 102. The rod end 102 includes a spherical bearing 104 and is best viewed in FIG. 4. Likewise, the encoder arm 98 includes one end 106 axially journaled in a rod end 108. The rod end 108 also includes a spherical bearing 110 and is best viewed in FIG. 4. The spherical bearings 104 and 110 are in registry with one another and with a cylindrical shaft 112. The shaft 112 is coaxial with the axis 114 which extends longitudinally along the radial center of the holding fixture 32 and substantially perpendicular to the bottom surface 116 of the fixture 32. The inner race 118 associated with bearing 104 and the inner race 120 associated with bearing 110 are coupled to the shaft 112 for movement with the shaft and fixture 32 as the fixture travels along the surface 30. The outer race 122 of bearing 104 is fixedly connected to the rod end 102 for rotational movement therewith and about the shaft 112 and the axis 114. The outer race 124 of bearing 110 is likewise fixedly connected to the rod end 108 for rotational movement with the rod end about the shaft 112 and the axis 114. The bearings 104, 110 and their respective associated rod ends 102,108 are selected to minimize lateral movement between the surfaces of the inner and outer races of the bearing and between the surfaces of the inner race and the shaft 112. The presence of lateral movement in either the bearings or between the coupling of the shaft 112 and a rod end results in reduced accuracy and excessive tolerances between the dimensional data produced by the tracing apparatus 10 and the actual dimensions of a traced lens opening.

Figure 7:
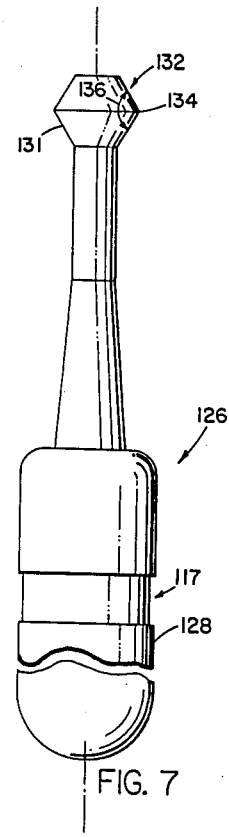
FIG. 7 is a side view of the tracing stylus used in following the eyewire groove along the inner periphery of a lens opening.

The stylus holding fixture 32 includes a stylus 126, as best viewed in FIG. 7, and which has an axially elongated, cylindrical lower portion 128. The outer diameter of the lower portion 128 is substantially equal to the inner diameter of ball bushings 111,113 arranged coaxially with the shaft 112. The stylus 126 is arranged for coaxial movement within the shaft 112 and the ball bushings 111,113 in the direction of arrow 130 to permit continuous adjustment of the vertical height of the stylus 126 to accommodate differences in the relative distance between the eyewire groove of one style eyeglass frame positioned on the bridge 34 and the surface 30 and the eyewire groove of a different style eyeglass frame positioned on the bridge 34 and the surface 30. Such vertical movement may also occur for example where the relative distance between the eyewire groove associated with the frame style and the fixture travel surface 30 varies at different measuring points along the inner periphery of the lens opening. A grip 115 fits around a grooved channel 117 located at the upper part of the lower portion 128 and is used to lift the stylus 126 in the direction of arrow 130.

The upper end 131 of the stylus 126 includes a circumferential outwardly V-shaped portion 132 having an apex 134 which is designed for complementary engagement with the eyewire groove of a lens opening. Preferably, the apex 134 is designed to have an angle 136 between the maximum angle of an eyewire groove as set forth in the ANSI standards and the maximum angle of the bevel on a lens. The maximum groove angle is set at 110 degrees and the maximum bevel angle is set at 130 degrees. Consequently, the stylus angle 136 is between the two maximum angles and preferably is 120 degrees.

Still referring to FIGS. 3 and 4, the frame tracing apparatus 10 includes an air pump or other air compressing apparatus 138 which is connected via a conduit 142 to an orifice 140 extending through the body of the fixture travel surface 30 to deliver air to the area between the lower surface 116 of the fixture 32 and the surface 30 whereby the air pressure developed between the surfaces 116 and 30 tends to lift the fixture 32. The lifting action produced by the air pressure facilitates the movement of the fixture 32 by an operator as the fixture is moved along its travel path to trace the inner periphery of a frame lens opening. The diameter of the base of the fixture 32 is sufficiently large so that the base covers the orifice 140 at each of the different points on the surface 30 over which the fixture 32 travels.

The encoder arm 96 has a variable length and comprises an axially elongated rod having its free end 144 supported by a rotatable encoding mechanism 146. The arm 96 is arranged for reciprocating movement in a direction indicated by arrow 148 as the length of the arm changes when the fixture 32 is moved along the travel surface 30. The end 144 of arm 96 moves along an arcuate path indicated by arrow 150 when the rotatable encoding mechanism 146 pivots about an axis 152. The axis 152 extends substantially perpendicularly to a plane parallel with the plane of the surface 30 and transverse to an axis 154 which extends axially lengthwise through the center of the arm 96.

The encoder arm 98 is substantially identical to the encoder arm 96. The arm 98 has a variable length and comprises an axially elongated rod having its free end 156 supported by a rotatable encoding mechanism 158. The arm 98 is arranged for reciprocating movement in a direction indicated by arrow 160 as the length of the arm changes when the fixture 32 is moved along the surface 30. The end 156 of the arm 98 moves along an arcuate path indicated by arrow 162 when the rotatable encoding mechanism 158 pivots about an axis 164. The axis 164 extends substantially perpendicularly to a plane parallel with the plane of the surface 30 and transverse to an axis 166 which extends axially lengthwise through the center of the arm 98.

The rotatable encoding mechanisms 146 and 158 are mounted on a mounting plate 168 in a spaced apart relationship to one another and at a predetermined distance C. The mounting plate 168 is secured to the base portion 14 of the housing 12. The distance C between the respective pivot axes 152,164 associated with the encoding mechanisms 146 and 158 comprises one side of a triangle. The data representative of and corresponding to the distance C is used by the microprocessor instruction set in conjunction with data representative of and corresponding to the change in length of the arms 96 and 98 as sensed by the encoding mechanisms 146 and 158 and explained below.

In FIG. 3, the length of the encoder arm 96 is designated by the letter A and represents the distance from the pivot axis 152 of the rotatable encoding mechanism 146 to the vertical axis 114 of the stylus holding fixture 32. The length of the encoder arm 98 is designated by the letter B and represents the distance between the pivot axis 164 of the rotatable encoding mechanism 158 and the longitudinal axis 114 of the fixture 32. The longitudinal axis 114 of the fixture 32 passes transversely through the intersection of the respective axes 154 and 166 of arms 96 and 98. As explained below, an X,Y coordinate corresponding to the intersection of axis 114 of the fixture 32 with a data point in a data space along the surface 30 is computed using trigonometric relationships and the arithmetric values of the lengths A,B and C.

Figure 6:
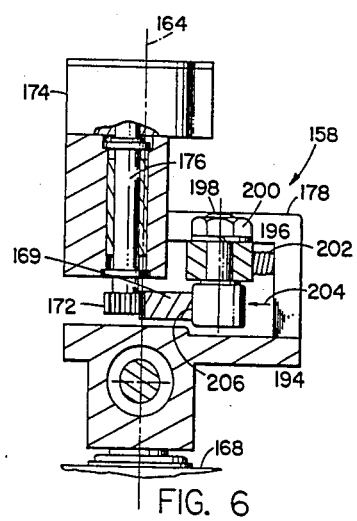
FIG. 6 is a diagrammatic view of the rotatable encoder mechanism taken along the line 6—6 of FIG. 5.

Referring now to FIGS. 3,5 and 6, the rotatable encoding mechanism 158 and its associated encoder arm 98 is shown in greater detail. The rotatable encoding mechanism 146 and the encoder arm 96 have similar elements and operate in the same manner as the mechanism 158 and arm 98. Consequently, for purposes of brevity the following discussion is directed specifically to the encoder arm 98 and its associated rotatable encoding mechanism 158 and it will be understood that the discussion also applies to the encoder arm 96 and its associated rotatable encoding mechanism 146.

A rack gear 169 is mounted lengthwise along and in a spaced relationship with the arm 98 near its free end 156. The teeth 170, 170 of the rack gear 169 are arranged for driving engagement with the teeth of a pinion gear 172. The gear 172 is connected to one end of a shaft 176 and the other end of the shaft is connected to a rotary encoder 174. The encoder 174 is mounted to a housing 178 and the housing 178 is coupled to the mounting plate 168 by a shaft 180. The shaft 180 has one end 181 rotatably mounted in a mounting assembly 182 and its other end 184 journaled in the lower portion of the housing 178. The encoding mechanism 158 rotates about the pivot axis 164 which extends axially through the center of the shaft 180 and intersects perpendicularly with the axis 166 of the arm 98. The pivot axis 164 passes substantially through the point of intersecting engagement of the teeth 170 of the rack gear 169 and the teeth of the pinion gear 172 so that the rotation of the rotary encoder shaft is the same for a given linear movement of the encoder arm 98 at all rotated positions about the pivot axis 164.

The rack gear 169 is coupled to the end 156 of the arm 98 by end coupling members 186 and 188. The end coupling members 186,188 have an opening through which the arm passes and are of the type that have a split section so that a screw or other device can be used to draw the split section together to engage and hold the surface of the arm. The coupling members 186 and 188 are releasable to facilitate alignment of the rack gear 169 with the pinion gear 172 and the encoding mechanism 158. In the illustrated embodiment, coupling member 186 includes a screw 190 for tightening and loosening the coupling member to and from the arm 98 and the coupling member 188 includes a screw 192 for tightening and loosening its associated coupling member to and from the arm 98.

The rotatable encoding mechanism 158 also includes a biasing assembly 194 for urging the teeth 170,170 of the rack gear 169 into engagement with the teeth of the pinion gear 172. The biasing mechanism 194 comprises a follower element 196 which is pivotally mounted to the encoder housing 178 by a bolt 198 passing through an opening at one end of the follower 196 and an opening in the housing 178 in registry with the follower opening. The bolt 198 is held to the housing by a nut 200. A biasing spring 202 is located between one surface of the follower 196 and a vertical inside wall surface of the housing 178 and urges the follower 196 in the direction of arrow 204 to cause the follower to press against the rear surface area 206 of the rack gear 169. The biasing mechanism 194 insures that the teeth 170,170 of the rack gear 169 are firmly engaged with the teeth of the pinion gear 172 to substantially eliminate gear backlash between the teeth of the rack gear and the pinion gear as the arm 98 moves the rack gear. Consequently, the positive engagement of the rack gear teeth 170,170 with the pinion gear substantially eliminates the introduction of rotational error that would normally be transmitted to the encoder 174 as the arm 98 is moved by the stylus holding fixture 32 in tracing the lens opening.

The rotatable encoding mechanism 146 associated with the encoding arm 96 operates similarly to the rotatable encoding mechanism 158. The encoding mechanism 146 includes an rotary encoder 208, a shaft and a pinion gear 210 coupled to the shaft to drive the encoder. The arm 96 includes a rack gear 212 coupled to the arm 96 and the rack gear includes a series of teeth 214,214 arranged for engagement with the teeth of the pinion gear 210 to rotate the encoder 208 when the arm 96 moves. A biasing mechanism 216 includes a follower element 218 and a biasing spring 220 which urges the follower 218 against the rear surface 222 of the rack gear 212 to maintain the rack gear teeth 214,214 in contact with the teeth of the pinion gear 210. The positive engagement of the rack gear teeth with the pinion gear substantially eliminates any backlash between the rack gear teeth and the pinion gear teeth and prevents the introduction of rotational error to the encoder 208 when the arm 96 is moved during the tracing process.

The encoders 174 and 208 are electrically connected to electronic circuitry located on the circuit board 20 (shown in FIG. 1) which circuitry senses the electrical signals produced by the encoders. The encoder used in the present invention may be one of a number of different types and which encoders and their respective operational characteristics are generally well known to those skilled in the art. Preferably, the encoder is of the optical incremental, direction sensitive type and generates pulses at a uniform spacing as the encoder shaft is rotated.

The electrical signals from the encoder output are electrically coupled to a counter circuit located on the circuit board 20 which counts the number of pulses generated by the encoder as the encoder shaft rotates from a starting position to an end position. The number of pulses counted corresponds to the linear movement of the encoder arm associated with the encoder. Since the relative change in the shaft rotational position is determined by the number of pulses generated by the encoder from a starting position to an end position, the shaft starting or zero position is not fixed. Consequently, the encoder shaft may initially be at any rotational position and from which position the relative incremental linear distance travelled by its associated encoder arm is determined by converting the number of pulses produced by the encoder between a starting and ending position to linear measurement units. For example, a count of ten pulses may be equivalent to a linear movement of one millimeter.

In the present embodiment, the microprocessor 24 is coupled to each counter associated with its respective encoder and reads the number of pulses counted by the counter during a sampling interval if any are produced by the encoder. The microprocessor 24, in accordance with the instruction set and the known relationship between the number of pulses produced by the encoder shaft rotation and corresponding to a given distance moved by the encoder arm, computes the incremental linear distance moved by the encoder arm during each sampling interval. The computed incremental distance is used by the microprocessor 24 as explained below to determine the X,Y rectangular coordinate for each data point in a data space wherein the data point defines the location of the stylus 126 at each sampled location along the travel path of the fixture 32 as the stylus 126 traces the inner periphery of a lens opening.

The X,Y rectangular coordinate information corresponding to the position of the stylus 126 at each sampled location along its travel path is produced by the tracing apparatus as follows. Referring to FIGS. 1-3, the front edge 92 of the platform 82 includes a V-shaped vertical reference notch 94. The location of the notch 94 is adjusted relative to the respective pivot axes 152 and 164 associated with arms 96 and 98 and the location of the notch is fixed at the time of manufacture. The adjustment comprises positioning the apex 134 of the stylus 126 held by the stylus holding fixture 32 in the notch 94 and adjusting the position of the front edge 92 and accordingly, the notch 94 so that the respective lengths A and B associated with arms 96 and 98 are equal to one another. In actuality the lengths A and B are of a known predetermined length when the apparatus is constructed according to a manufacturing design specification. The length C between the pivot points 152 and 164 is fixed and also equal to a known predetermined length. The lengths A,B and C represent the lengths of the three sides of a triangle and when the triangle is transferred to a cartesian coordinate data space, that is, superimposed on a rectangular coordinate data space with the vertex of the angle formed by sides A and C presumed to be the origin, the X,Y rectangular coordinate at the intersection point of the sides A and B relative to the origin of the X,Y coordinate data space at any point in the data space can be determined using well known trigonometric relationships. Although a reference notch 94 is used as the calibration position in the illustrated embodiment, the same result is achieved by extending the stylus holding fixture 32 in a direction away from the bridge 34 so that the respective lengths of A and B associated with arms 96 and 98 are equal to one another and using this position as the calibration position.

Assume for example in the present disclosure that the pivot axis 152 is the origin of the X,Y rectangular coordinate data space and the X-axis extends along the line defined by the pivot axes 152 and 164 and further that the length C lies on the X-axis. Further assume that the Y-axis extends perpendicularly to the X-axis and passes through the pivot point axis 152 thereby making the pivot axis 152 the origin of the data space, that is, X(0), Y(0). With the above assumptions, the location of the stylus holding fixture 32 and accordingly, the stylus 126 can be expressed as an X,Y rectangular coordinate at any point on the data space using the following formulas:

$$X = \frac{A^2 - B^2 + C^2}{2C}$$

$$Y = \sqrt{A^2 - X^2}$$

where A is the length of arm 96; B is the length of arm 98; and C is the distance between the two pivot axes 152 and 164.

The frame tracing apparatus 10 is conditioned to generate the X,Y rectangular coordinate information representative of the position of the stylus 126 along the travel surface as follows. The fixture 32 is moved to position the apex 134 of the stylus 126 in position in the reference notch 94 after power is applied to the apparatus 10. The respective pulse counters associated with the encoders 174 and 208 are initialized or set to zero and because the lengths A and B are known when the stylus 126 is located in the notch 94, the corresponding X,Y coordinate is known. The apparatus 10 is calibrated when the stylus apex 134 is in the notch 94 and an INITIALIZE function key 19 on the keypad 18 is operated. The stylus 126 is then moved to the inner periphery of the lens opening and the apex 134 is positioned in the eyewire groove of the eyeglass frame held in position on the bridge 34 to start the tracing process.

The tracing process is initiated through the operation of a START function key 21 on the keypad 18. The microprocessor 24 senses the start of a trace and samples the contents of the pulse counters associated with the encoders 174 and 208 to determine if there has been a change in the A and B lengths, that is, has the pulse count of the counters changed in response to rotation of the corresponding encoder shaft and, if the count has changed, has it increased above a threshold count since the last sample. If the threshold count is exceeded, the microprocessor reads the counters and stores the pulse count associated with the data point sensed. The microprocessor instruction set cycle time is sufficiently fast to recognize incremental movements of the stylus 126 and causes a reading to be recorded at each of a desired number of data points in the data space along the travel path regardless of the speed at which the stylus is moved along the inner periphery of the lens opening. The length of A and B at each data point is determined by algebraically adding the incremental change in length to the last known length.

The data representative of the incremental change in length A and B is gathered at substantially uniform spacings along the travel path and preferably corresponding to one degree intervals around the inner periphery of the lens opening. At the completion of a trace, the microprocessor computes in accordance with the instruction set which includes the above formulas, the corresponding coordinates for each of the data points sensed along the travel path. The information representative of the coordinates defining the size and shape of the traced lens opening is converted to a digitally coded signal and is stored in a memory device such as a RAM, etc. for subsequent use and processing by the frame tracing apparatus 10. The digital signal information may be used by other ancillary equipment for example, lens edge contouring and grinding apparatus, or may be transmitted to a remote data base computer for subsequent use or processing, etc., or to a lens pattern generator such as the one disclosed in a copending application entitled "METHOD AND APPARATUS FOR MAKING A PATTERN FOR A LENS OPENING IN AN EYEGLASS FRAME" filed concurrently herewith and assigned to the same assignee as the present invention.

A JOB function key 35 located on the key pad 18 is used to assign a specific identifying number to a set of dimensional data for a given trace to permit subsequent access and retrieval from the tracer's memory. The job number is entered before the end of a trace by operating the JOB function key 35 and entering a desired job number via the numeric keys of the key pad 18.

In the present invention, the end of a trace is indicated by any of the following techniques. In one case, the microprocessor 24 recognizes that the stylus 126 has traversed a complete trace around a lens opening by sensing that an excessive number of data point readings have been taken and recorded. In response to the detection of the excessive number of sensed points, the microprocessor 24 limits the number to a predetermined number of data points. The number of sensed data points necessary per trace to accurately describe a lens opening of a given size is predetermined and stored in a table in the instruction set. In another case, the end of the trace can be manually signalled at any time through the operation of any key on the keypad 18.

Another feature of the frame tracing apparatus 10 embodying the present invention allows the distance between lens openings in an eyeglass frame to be easily determined. The eyeglass frame is held and oriented on the bridge 34 as described above and further is positioned so that the nose bridge of the eyeglass frame is over the vicinity of the stylus 126 and stylus holding fixture 32. It is assumed that the apparatus and stylus starting position is calibrated as described above. The DBL (distance between lens) function key 23 located on the keypad 18 is operated and the inner periphery of the lens openings at the nasal on both sides of the nose bridge of the eyeglass frame is traced. The microprocessor 24 senses as described above the pulse count of the counters associated with the encoders 174 and 208 and in accordance with the instruction set calculates the distance between the lens openings and displays the calculated distance on the display 28.

The tracing apparatus 10 may be coupled to a printer for printing on a receiving medium such as paper, the dimensional data according to the option selected characterizing the size and shape of the lens opening, the distance between lens openings and other data. A printer coupled to the apparatus 10 is activated by operating the PRINT function key 25 on the keypad 18. The dimensional data may also be sent to a pattern generator coupled to the tracing apparatus 10 by operating the TRANSMIT function key 27 on the keypad 18. The data in the illustrative embodiment is transmitted using the conventional, well known RS-232 data format.

Operation of the EYE function key 29 on the keypad 18 permits an operator of the tracing apparatus 10 to trace either the right or left lens opening an an eyeglass frame and produce the mirror image of the traced opening, that is, a right opening is characterized as a left opening and a left opening is characterized as a right opening respectively.

The tracing apparatus 10 may also be used to characterize the size and shape of a lens or a pattern in a similar manner as a frame lens opening. Referring to FIGS. 8-12, a tracing stylus for use in tracing the outer periphery of a lens or pattern is shown in FIG. 8 and designated 250. The stylus 250 is similar to the eyewire groove tracing stylus 126 except for the upper tracing position. The stylus 250 includes an axially elongated cylindrical tracing portion 252 for following the surface of the outer periphery of a lens or pattern. The stylus 250 has an elongated lower portion 253 similar to the lower portion 128 of stylus 126 and the lower portion 253 also moves lengthwise in the ball bearings 111,113 of the stylus holding fixture 32. The stylus 250 includes an optional groove 251 for retaining a grip similar to the grip 115 used with the stylus 126 shown in FIG. 4.

A lens mounting block assembly designated 254 is shown in FIGS. 9 and 10 and is used to hold a lens to be traced in a cantilevered fashion over the area of movement of the tracing stylus holding fixture 32 of the tracing apparatus 10 of FIG. 1. The assembly 254 includes locating pins 256 and 258 and a fastener 260 extending from the underside 262 of the assembly. The locating pins 256 and 258 and fastener 260 are positioned for complementary engagement with locating openings 264, 266 and a fastener receiver 268 located along the surface 81 of the platform 82. The fastener 260 and receiver 268 are preferably of the quick release type to permit easy and quick attachment and removal of the assembly 254 from the platform 82. The assembly includes an arm 270 for holding a lens mounting block 272.

A lens to be traced is mounted to the block 272 by means of a double sided adhesive pad 274 well known to those skilled in the art. The pad 274 is applied to the mounting surface 276 of the block 272 so that the central hole 278 in the pad leaves the cross intersection 280 and hash marks 281,281 aligned with the intersection 280 and on opposite sides of the mounting surface exposed to permit proper centering and horizontal axis alignment of a lens with respect to the stylus travel surface 30 of the tracing apparatus 10. The mounting surface 276 of the block 272 has a slight curvature to accommodate any curvature in the surface of a lens held by the assembly 254.

A pattern mounting block assembly designated 282 is shown in FIGS. 11 and 12 and is used to hold a pattern to be traced in a cantilevered fashion over the area of movement of the tracing stylus holding fixture 32 of the tracing apparatus of FIG. 1. The assembly 282 is similar to the lens mounting block assembly 254 and mounts to the surface 81 of the platform 82 as described above for the lens mounting assembly where like numbered elements are identical for both assemblies. The pattern mounting assembly 282 includes an arm 284 for holding a pattern mounting block 286.

A pattern to be traced is mounted to the block 286 by means of an indent post 288 extending perpendicularly from the underside 290 of the block and passing through the centering hole of the pattern. The post 288 includes a spring loaded indent snap 292 to retain a pattern to the block 286. The block also includes alignment pins 294,296 in a spaced apart relation to each other and the indent post 288 to form a standard hole chucking arrangement well known to those skilled in the art.

The type of trace to be done, that is, a lens opening using a stylus 126 or a lens/pattern using a stylus 250 is selected by operation of the LENS function key 31 on the keypad 18. The instruction set includes an algorithm to compensate for the radius offset of the stylus tracing portion when calculating the dimensional data characterizing the size and shape of the lens opening, lens or pattern. The algorithm used for compensating for the stylus radius offset is similar to that used in milling machine operations to produce properly sized parts. Without such compensation, lens produced from dimensional data generated by tracing a lens opening would be undersized for the associated lens opening and lens or patterns produced from dimensional data generated by tracing a lens or pattern would be oversized.

The dimensional data generated by a trace may be increased or decreased a predetermined amount by operating a SIZE function key 33 on the keypad 18. The size of a trace can be increased or decreased in 0.01 millimeter increments up to 9.99 millimeters by operating the SIZE key 33 and inputting the desired size change via the numeric keys of the keypad 18. The instruction set computes the radii of a trace as described above taking into account the desired size change.

Figure 14:
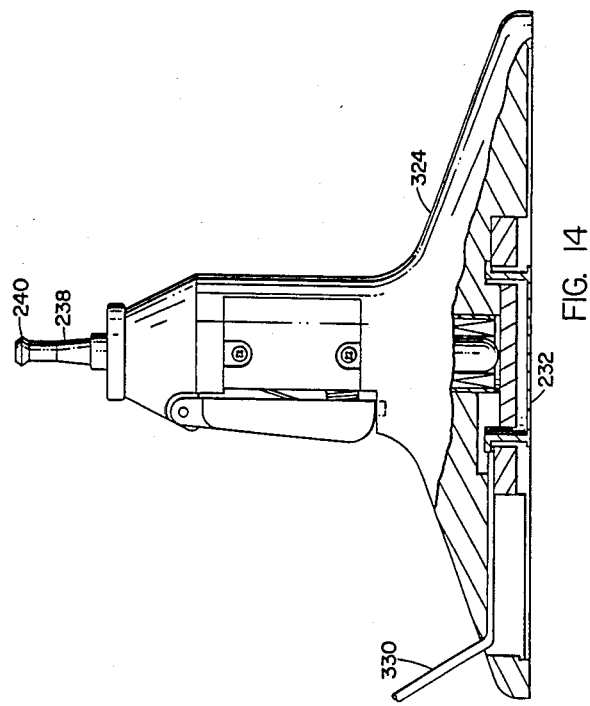
FIG. 14 is a side elevational view partially cut away of the stylus holding fixture used in the embodiment of the frame tracing apparatus of FIG. 13.

Referring now to FIGS. 13 and 14, the frame tracing apparatus is shown in FIG. 13 in another embodiment and is designated 310. The apparatus 310 is similar to the tracing apparatus 10 of FIG. 1 and includes a housing 312, a keypad 314 for entering information in the form of digitally encoded electrical signals to activate and control the operation of the tracing apparatus 310. An alphanumeric display 316 functions as an operator prompt by displaying messages and instructions to carry out the tracing procedure. The display 316 also displays coordinate information and other data related to the dimensional characterization of a traced eyeglass frame lens opening, lens or pattern. The apparatus 310 includes an eyeglass frame support structure or bridge 318 upon which an eyeglass frame 334 shown in phantom is placed and positioned against a front edge 332 for tracing and to maintain A axis alignment. An eyeglass frame holding mechanism 322 is mounted to an overhead platform 320 and is located adjacent to the bridge 318. The apparatus 310 further includes a stylus holding fixture 324 arranged for movement along the surface 326 of a digitizer tablet 328. An electrical conduit 330 carries electrical signals between a sensor in the stylus holding fixture 324 and electrical circuitry located within the housing 312 and which circuitry is sensitive to and responsive to the electrical signals and is well known to those skilled in the art.

The apparatus 310 operates similarly to that of the frame tracing apparatus 10 shown in FIG. 1 and described above and the operation of the bridge 318 and the bridge rotating mechanism 336 are similar to the bridge 34 and bridge adjustment mechanism 48 respectively of FIG. 1. The frame holding mechanism 322 of FIG. 8 is similar in appearance and operation to the frame holding mechanism 62 of FIG. 1. A microprocessor, for example, one similar to the microprocessor 24 of FIG. 1 is located within the frame tracing apparatus 310 and contains a similar instruction set to control the operation of the apparatus.

Still referring to FIG. 13, the digitizer tablet 328 may be one of any well known conventional designs and may be of the type manufactured by Numonics Corporation. Digitizer tablets and their operation are generally well known to those skilled in the art.

The fixture 324 includes a stylus 238 which stylus is similar to the stylus 126 of the apparatus 10 described above. The stylus 238 includes an apex 240 that engages with the eyewire groove of a lens opening in an eyeglass frame and serves as a guide as the stylus is moved to follow the inner periphery of a lens opening. The fixture 324 may also use a stylus similar to the stylus 250 of FIG. 8 for tracing the outer periphery of a lens or a pattern.

The tracing procedure is similar to that described above and the microprocessor 24 is sensitive to and responsive to circuitry coupled to a cursor 232 in the stylus holding fixture 324. As the fixture 324 is moved along the digitizer tablet 328, the cursor senses signals corresponding to each of the coordinates along the travel path. The information sensed by the cursor 232 is recorded at each of the data points along the travel path of the stylus 238 as it traces the inner periphery of a lens opening. Upon completion of a trace, the microprocessor 24 computes in accordance with the instruction set and from the sensed coordinate information as described above the box dimensions, mechanical center, longest diameter and radii of the traced lens opening to dimensionally characterize the size and shape of the traced lens opening.

The information associated with the size and shape of the lens opening and generally represented by a radial length and its associated angle is converted to a digitally encoded signal and is stored in a memory device in the apparatus 310 for subsequent access by an operator and use, for example, with ancillary equipment such as a lens edge grinding and contouring apparatus, a remote computer data base, a pattern generator or a printer.

Apparatus for tracing the inner periphery of an eyeglass frame lens opening to generate a number of coordinates each of which define a position along the traced path and collectively characterize the size and shape of the lens opening, a lens or a pattern has been described in several embodiments. It will be understood, however, that numerous modifications and changes may be made by those skilled in the art without departing from the scope and the spirit of the invention. Therefore, the invention has been described by way of illustration rather than limitation.

We claim:

1. Apparatus for tracing a lens opening in an eyeglass frame and generating a set of coordinates to characterize the size and shape of the traced lens opening, said apparatus comprising:
   an eyeglass frame support for holding the frame lens opening in a plane substantially parallel with a reference plane ande in a fixed, stationary orientation relative to said frame support and said reference plane, said reference plane including a number of data points comprising a data space;
   tracing means movable in the vicinity of said frame support and parallel to the reference plane for following the inner periphery of the lens opening in an eyeglass frame located on said support;
   sensing means coupled to the tracing means for sensing said tracing means at a number of data points in said data space along the travel path of said tracing means, and
   computing means responsive to the sensing means for computing the set of coordinates at each of said number of sensed data points along the travel path.

2. Apparatus for tracing a lens opening in an eyeglass frame and generating a set of coordinates as defined in claim 1, wherein said tracing means includes:
   a first stylus, said first stylus having an axially elongated cylindrically shaped body having an upper tracing section, said tracing section including a circumferential apex around its outer surface for complementary engagement with the eyewire groove along the inner periphery of the lens opening of an eyeglass frame, and
   a stylus holding fixture, said fixture having a base at one end and a tower portion at the other end opposite the base and a longitudinal axis extending between said base and said tower through the radial center of said fixture, said tower including an axially elongated, cylindrically shaped cavity for receiving and slidably holding said first stylus for axial movement in a direction substantially perpendicular to said reference plane and toward and away from an eyeglass frame located on said support.

3. Apparatus for tracing a lens opening in an eyeglass frame and generating a set of coordinates to characterize the size and shape of the traced lens opening, said apparatus comprising:
   an eyeglass frame support for holding the frame lens opening in a plane substantially parallel with a reference plane, said reference plane including a number of data points comprising a data space;
   tracing means moveable in the vicinity of said frame support and parallel to the reference plane for following the inner periphery of the lens opening in an eyeglass frame located on said support;
   sensing means coupled to the tracing means for sensing said tracing means at a number of data points in said data space along the travel path of said tracing means, and
   computing means responsive to the sensing means for computing the set of coordinates associated with each of said number of sensed data points along the travel path;
   said tracing means further including:
   a first stylus, said first stylus having an axially elongated cylindrically shaped body having an upper tracing section, said tracing section including a circumferential apex around its outer surface for complementary engagement with the eyewire groove along the inner periphery of the lens opening of an eyeglass frame;

a stylus holding fixture, said fixture having a base at one end and a tower portion at the other end opposite the base and a longitudinal axis extending between said base and said tower through the radial center of said fixture, said tower including an axially elongated, cylindrically shaped cavity for receiving and slidably holding said first stylus for axial movement in a direction substantially perpendicular to said reference plane and toward and away from an eyeglass frame located on said support;

a first encoding arm having a pivot end and a free end opposite said pivot end;

a second encoding arm having a pivot end and a free end opposite said pivot end;

each of said first and second encoding arms being coupled at its respective pivot end to said stylus holding fixture for limited rotational movement about said fixture longitudinal axis and in a plane substantially parallel to said reference plane;

first means coupled to said apparatus for slidably supporting said free end of said first arm for reciprocating movement in the longitudinal direction of said first arm, said first arm supporting means being rotatable about a first rotational axis, said axis being normal to said reference plane and passing transversely through the longitudinal axis of said first arm;

second means coupled to said apparatus for slidably supporting said free end of said second arm for reciprocating movement in the longitudinal direction of said second arm, said second arm supporting means being rotatable about a second rotation axis, said axis being normal to said reference plane and passing transversely through the longitudinal axis of said second arm;

said first and second arm supporting means being disposed opposite one another in a fixed, spaced apart relationship along a first line, and the distance between said first and second rotation axes representing the length of one side of a triangle;

said first encoder arm further having a variable length, said length being equal to the distance between said first rotation axis and said fixture longitudinal axis, said length of said first arm representing the second side of said triangle;

said second encoder arm further having a variable length, said length being equal to the distance between said second rotation axis and said fixture longitudinal axis, said length of said second arm representing the third side of said triangle, and said stylus having a calibration position wherein the length of said first arm and the length of said second arm are known and equal to a predetermined length and said calibration position of said stylus is defined by a set of coordinates representative of a reference data point in said data space.

4. Apparatus for tracing a lens opening in an eyeglass frame and generating a set of coordinates as defined in claim 3 wherein said sensing means includes:

first distance sensing means coupled to and associated with said first encoding arm for sensing a change in the length of said first arm and corresponding to said stylus being moved from a first sensed data point to a second sensed data point in said data space, and second distance sensing means coupled to and associated with said second encoding arm for sensing a change in the length of said second arm and corresponding to said stylus being moved from said first to said second sensed data point.

5. Apparatus for tracing a lens opening in an eyeglass frame and generating a set of coordinates as defined in claim 4 wherein:

said first distance sensing means comprises a first incremental, directional sensitive shaft encoder;

said second distance sensing means comprises a second incremental shaft encoder, and said computing means including means for algebraically determining the incremental change in length of said first and second arms and corresponding to said stylus being moved from said first to said second sensed data points and for calculating the new lengths of said first and second arms associated with said stylus being located at said second sensed data point, and said computing means further including means for computing in accordance with a predetermined algorithm and using the lengths of said first and second arms at said second sensed data point the coordinate set defining said second sensed data point in said data space.

6. Apparatus for tracing a lens opening in an eyeglass frame and generating a set of coordinates as defined in claim 5 wherein said computing means further includes means for calculating the set of coordinates for only those adjacent data points along the travel path that are at a predetermined spaced apart distance from an immediately prior sensed data point.

7. Apparatus for tracing a lens opening in an eyeglass frame and generating a set of coordinates as defined in claim 6 wherein a predetermined number of data points along the travel path are sensed and a like number of coordinates defining said predetermined number of data points are computed.

8. Apparatus for tracing a lens opening in an eyeglass frame and generating a set of coordinates as defined in claim 3 wherein said apparatus further includes a planar surface in the vicinity of said frame support for supporting said stylus holding fixture and upon which surface said fixture moves.

9. Apparatus for tracing a lens opening in an eyeglass frame and generating a set of coordinates as defined in claim 8 further including air suspension means for providing an air cushion between said support surface and said base of said stylus holding fixture whereby a positive air pressure is created between said base and said support surface thereby tending to urge said fixture away from said surface to faciliate the movement of said fixture along its travel path.

10. Apparatus for tracing a lens opening in an eyeglass frame and generating a set of coordinates as defined in claim 9 wherein said air suspension means includes conduit means for delivering air under pressure from an air source to an area of said support surface covered by said base.

11. Apparatus for tracing a lens opening in an eyeglass frame and generating a set of coordinates as defined in claim 9 wherein said means for delivering pressurized air includes a conduit coupled to said fixture base, said base having aperature means therein for directing said air to the area between said base and said surface.

12. Apparatus for tracing a lens opening in an eyeglass frame and generating a set of coordinates as defined in claim 1 wherein said sensing means comprises a digitizer tablet, and said tracing means cooperates with said digitizer tablet to generate a signal representative of the position of said tracing means at a number of different data points in said data space as said tracing means moves along the travel path.

13. Apparatus for tracing a lens opening in an eyeglass frame and generating a set of coordinates as defined in claim 3 further including means for converting the set of coordinates associated with a sensed data point along the travel path to an equivalent radius length and an associated rotation angle.

14. Apparatus for tracing a lens opening in an eyeglass frame and generating a set of coordinates as defined in claim 3 further including means for determining the A and B box dimensions and the mechanical center associated with a traced lens opening.

15. Apparatus for tracing a lens opening in an eyeglass frame and generating a set of coordinates as defined in claim 14 further including means for determining the effective diameter of the traced lens opening.

16. Apparatus for tracing a lens opening in an eyeglass frame and generating a set of coordinates as defined in claim 3 further including:
   means for holding a lens in said plane parallel with said reference plane, and
   a second stylus, said second stylus having an axially elongated cylindrically shaped body having a base section and an upper tracing section, said upper tracing section being axially elongated and cylindrically shaped, said second stylus being held for axial movement by said stylus holding fixture.

17. Apparatus for tracing a lens opening in an eyeglass frame and generating a set of coordinates as defined in claim 16 further including means for holding a pattern in said plane parallel with said reference plane.

18. Apparatus for tracing a lens opening in an eyeglass frame and generating a set of coordinates as defined in claim 7 wherein said predetermined number of data points is equal to 400 data points.

* * * * *